US005646456A

United States Patent [19]
Udoh et al.

[11] Patent Number: 5,646,456
[45] Date of Patent: Jul. 8, 1997

[54] ANTI-THEFT CAR PROTECTION SYSTEM

[75] Inventors: Hiroshi Udoh, Chigasaki; Hirosi Funakosi, Zama, both of Japan

[73] Assignee: Nissan Motor Co., Ltd., Yokohama, Japan

[21] Appl. No.: 363,036

[22] Filed: Dec. 23, 1994

[30] Foreign Application Priority Data

Dec. 27, 1993 [JP] Japan .................. 5-331815

[51] Int. Cl.$^6$ .................. B60R 25/04
[52] U.S. Cl. .................. 307/10.5; 180/287
[58] Field of Search .................. 307/10.2–10.6; 70/DIG. 46; 123/198 DB, 198 DC; 180/287; 340/425.5, 426, 825.31, 825.34, 825.44, 825.54, 825.69, 825.72, 825.75; 361/172

[56] References Cited

U.S. PATENT DOCUMENTS

| | | | |
|---|---|---|---|
| 4,463,340 | 7/1984 | Adkins et al. | 307/10.4 |
| 4,758,835 | 7/1988 | Rathmann et al. | 340/825.31 |
| 5,055,701 | 10/1991 | Takeuchi | 307/10.2 |
| 5,229,648 | 7/1993 | Sues et al. | 307/10.2 |
| 5,252,861 | 10/1993 | Steeby et al. | 307/10.6 |
| 5,365,225 | 11/1994 | Bachhuber | 340/825.31 |
| 5,416,471 | 5/1995 | Treharne et al. | 340/825.31 |

FOREIGN PATENT DOCUMENTS 55-151133  11/1980  Japan .
2269253   2/1994  United Kingdom .................. 307/10.5

OTHER PUBLICATIONS

*Combatting Car Theft*, AAA World, Nov./Dec. 1994, pp. 30–31, Terry White.

Primary Examiner—Richard T. Elms
Attorney, Agent, or Firm—Lowe, Price, LeBlanc & Becker

[57] ABSTRACT

An anti-theft car protection system has a first control unit for controlling the fuel injection to an engine. The first control unit is capable of starting the engine upon receiving an engine start instruction signal and capable of storing a first rolling code. A second control unit is provided which is capable of storing a second rolling code. The system provides an interactive communication between the first and second control units when actuated and issues "ON" signal when an ignition key cylinder of an associated motor vehicle is turned from "OFF" position to "ON" position. The system, upon receiving the "ON" signal, feeds the first control unit with the engine start instruction signal and sends the second rolling code to the first control unit. The system then compares the first and second rolling codes and issues an agreement signal upon agreement of the first and second rolling signals and issues a disagreement signal upon disagreement of these signals. The system, upon receiving the agreement signal, permits continuation of the feeding of the engine start instruction signal to the first control unit, and which, upon receiving the disagreement signal, cancels the feeding of the engine start instruction signal to the first control unit.

38 Claims, 13 Drawing Sheets

FIG.13
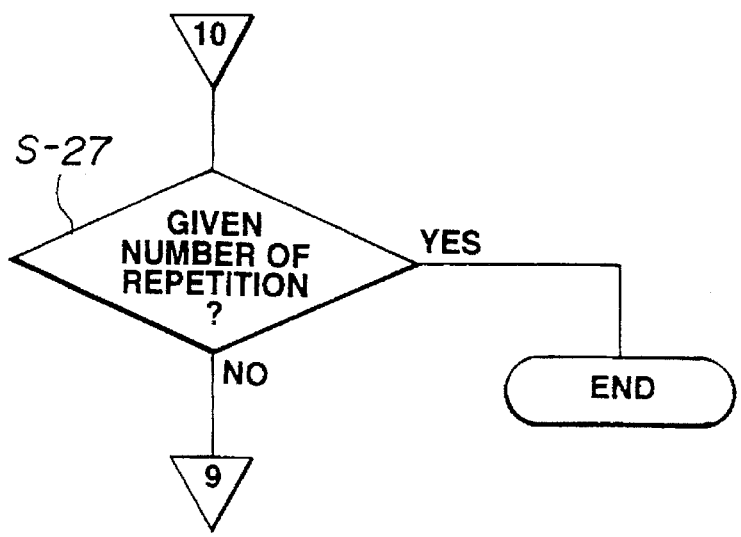
FIG.15
PROTOCOL FORMAT
ECCS → ESICS :
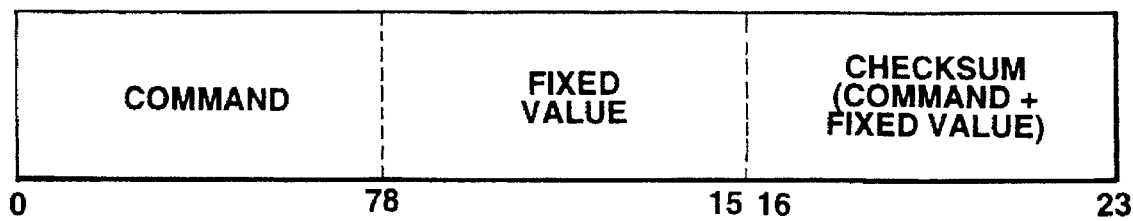
ESICS → ECCS :
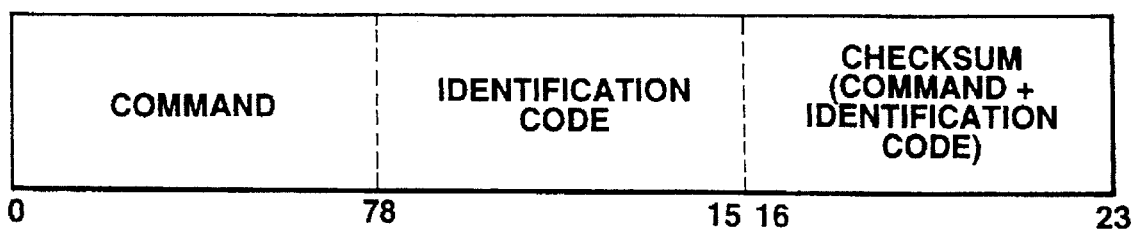

FIG.14

| DEVICE | COMMANDS MEANING | BINARY |
|---|---|---|
| ECCS → ESICS | COMMUNICATION CONDITION | 00010001 |
| | INITIALIZATION | 00110011 |
| | RENEWAL OF IDENTIFICATION CODE | 01110111 |
| ESICS → ECCS | ESICS NEW? | 00010001 |
| | KEY PROPER? | 00110011 |
| | KEY IMPROPER | 01110111 |
| | IDENTIFICATION CODE REGISTRATION | 11111111 |

ANTI-THEFT CAR PROTECTION SYSTEM

BACKGROUND OF THE INVENTION

1. Field of the Invention

The present invention relates in general to anti-theft car protection systems and more particularly to the anti-theft car protection systems of a type which uses a microcomputer. More specifically, the present invention is concerned with an anti-theft car protection system which uses, as a part thereof, the microcomputer which controls operation of the engine of the associated vehicle.

2. Description of the Prior Art

Nowadays, many motor vehicles are powered by electrically controlled internal combustion engines for the reasons of high responsive, reliable, powerful and economical operation of the same.

One of such engines is shown in Japanese Patent First Provisional Publication 55-151133. The engine is controlled by an electronic centralized control system "ECCS". For controlling the engine operation, the system "ECCS" has an electrical control unit "ECU" which comprises a microcomputer. When an ignition key cylinder is turned to "START" position, a crank shaft is driven by a starter motor and at the same time a controlled amount of fuel is injected into the engine, so that the engine starts. That is, upon turning of the ignition key cylinder to "START" position, the electrical control unit "ECU" calculates the pulse width of a control pulse signal which is to be applied to each of the fuel injection valves at the engine start. The pulse width represents the open period of the injection valve, so that the amount of fuel fed to the engine corresponds to the pulse width.

However, almost all of such engines have no defense against a thief. That is, if a short circuit is illegally made by a car thief handling a pick, wire or the like in the engine start circuit, the engine is permitted to start. In this case, the car can be easily stolen off by the thief.

SUMMARY OF THE INVENTION

It is therefore an object of the present invention to provide an anti-theft car protection system which can assuredly inhibit starting of the engine in the above-mentioned illegal handling by a car thief.

It is another object of the present invention to provide an anti-theft car protection system which uses, as a part thereof, a microcomputer of a known engine control unit which controls operation of an internal combustion engine.

According to a first aspect of the present invention, there is provided an anti-theft car protection system for a motor vehicle powered by an engine. The system comprises a first control unit for controlling the fuel injection to the engine, the first control unit being capable of starting the engine upon receiving an engine start instruction signal and capable of storing a first rolling code; a second control unit which is capable of storing a second rolling code; the system provides an interactive communication between the first and second control units when actuated; and issues an "ON" signal when an ignition key cylinder of the vehicle is turned from an "OFF" position to an "ON" position; and, upon receiving the "ON" signal, sends the second rolling code to the first control unit; then compares the first and second rolling codes and issues an agreement signal upon agreement of the first and second rolling signals and, issues a disagreement signal upon disagreement of these signals; and, upon receiving the agreement signal, permits the feeding of the engine start instruction signal to the first control unit, and which, upon receiving the disagreement signal, cancels the feeding of the engine start instruction signal to the first control unit.

According to a second aspect of the present invention, there is provided an anti-theft car protection system for a motor vehicle powered by an engine. The system comprises a first control unit for controlling the fuel injection to the engine, the first control unit being capable of starting the engine upon receiving an engine start instruction signal and capable of storing a first rolling code; a second control unit which is capable of storing a second rolling code; the system provides an interactive communication between the first and second control units; and issues an "ON" signal when an ignition key cylinder of the vehicle is turned from an "OFF" position to an "ON" position; then, upon receiving the "ON" signal, feeds the first control unit with the engine start instruction signal and issues a new unit representing signal when one of the first and second control units is new; and initializes the first and second rolling codes when receiving the new unit representing signal.

According to a third aspect of the present invention, there is provided an anti-theft car protection system for a motor vehicle powered by an engine. The system comprises a first control unit capable of storing a first identification code; a second control unit capable of storing a second identification code, the second and first control units being connected through an interactive communication line; the system issues an "ON" signal when an ignition key cylinder of the vehicle is turned from an "OFF" position to an "ON" position for instructing starting of the engine; and, upon receiving the "ON" signal, compares the first and second identification codes, and issues a disagreement signal when the first and second identification codes disagree with a given combination; and suppresses starting of the engine when receiving the disagreement signal; and changes the given combination of the first and second identification codes after starting of the engine.

BRIEF DESCRIPTION OF THE DRAWINGS

Other objects of the present invention will become apparent from the following description when taken in conjunction with the accompanying drawings, in which:

FIGS. 7 to 13 are flowcharts showing programmed operation steps carried out in a microcomputer used in a second embodiment of the present invention;

FIG. 14 is a table showing the contents of commands which are transmitted between an electronic centralized control system (ECCS) and an engine start inhibiting control system (ESICS), in the second embodiment; and FIG. 15 is a table showing protocol formats of the communication between the ECCS and ESICS.

DETAILED DESCRIPTION OF THE INVENTION

Figure 1:
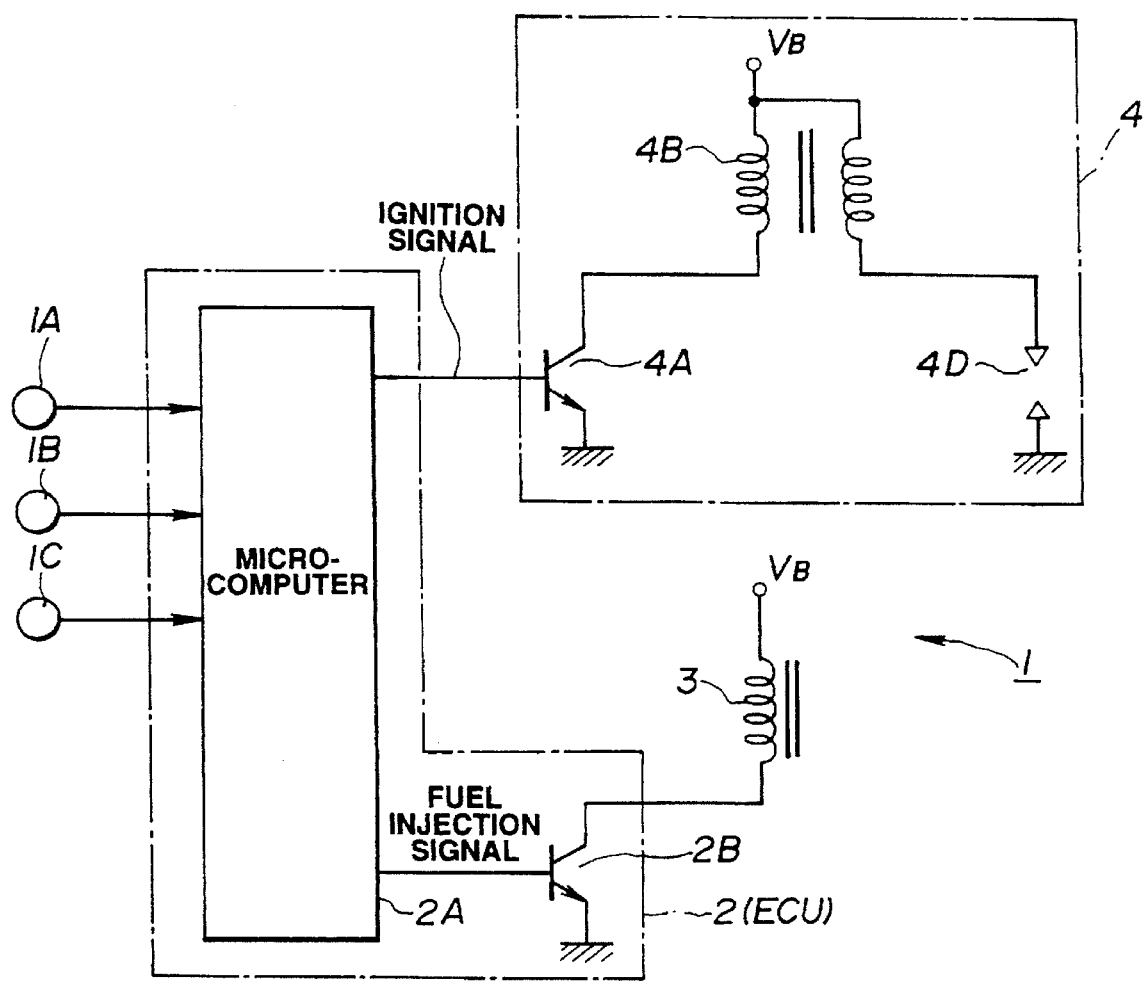
FIG. 1 is a block diagram of an electronic centralized control system (ECCS) for controlling operation of an automotive internal combustion engine.

Referring to FIG. 1 of the drawings, there is shown an electronic centralized control system 1 (which will be referred to as "ECCS" hereinafter for ease of description) for controlling an internal combustion engine. The ECCS 1 comprises generally various sensors, such as ignition switch 1A, a crankangle sensor 1B, an air flow meter 1C, etc., an electrical control unit 2 (which will be referred to "ECU" hereinafter) which receives information signals from the sensors and various actuators (not shown) which are operated in accordance with control signals from the ECU 2.

The ECU 2 is designed to control various items, such as fuel injection amount, ignition timing, idling speed, circulation gas amount and the like. However, in FIG. 1, only two items are shown, which are the fuel injection amount and the ignition timing. By a microcomputer 2A of the ECU which carries out a digital control, the amount of fuel injected into the combustion chambers through injection valves as well as the timing of igniting the combustible mixture in combustion chambers are controlled. The fuel injection valves are mounted to an intake manifold in a conventional manner, and a transistor type ignition system is used for igniting the combustible mixture.

As will be seen from the drawing (FIG. 1), when receiving "ON" signal from the microcomputer 2A, a power transistor 2B for a fuel injection valve becomes "ON" thereby energizing a solenoid coil 3 and thus fully opening the valve. While, when receiving "OFF" signal, the power transistor 2B becomes "OFF" thereby deenergizing the solenoid coil 3 and thus fully closing the injection valve. During open state of the valve, fuel under a given pressure is injected into the intake manifold. Accordingly, the amount of fuel injected into the combustion chamber is proportional to the open period of the fuel injection valve.

Furthermore, when receiving "ON" signal from the microcomputer 2A, a power transistor 4A for the ignition system 4 becomes "ON" thereby energizing a primary coil 4B, while, when receiving "OFF" signal, the power transistor 4A becomes "OFF" thereby deenergizing the primary coil 4B. With repeat of this ON-OFF operation of the primary coil 4B, a high-tension electric power is generated by a secondary coil, which causes a spark at an ignition plug 4D. As is known, the ignition timing is controlled by adjusting the time when the power transistor 4A is turned from "ON" condition to "OFF" condition. In cold starting of the engine, the ignition timing is delayed. With this, the exhaust temperature is quickly increased and thus engine warm up is promoted.

The ECU 2 is installed in a single chip. When getting out of order, the chip is entirely replaced with a new one. As will be described hereinafter, an electric control unit "ECU" for "ESICS" is also installed in a signal chip.

In accordance with the present invention, the following measure is further employed.

As will be seen from FIG. 2, in addition to the above-mentioned ECCS 1, there is further employed an engine start inhibiting control system 11 (which will be referred to as "ESICS" hereinafter for ease of description). The "ESICS" comprises an electric control unit which has a microcomputer. The "ECU" 2 of the ECCS and the "ECU" of the "ESICS" 11 are connected through an interactive communication line 12.

The "ECU" 2 of the "ECCS" constitutes a first control unit, while the "ECU" of the "ESICS" constitute a second control unit.

The "ESICS" has a function to communicate with a transponder 13 installed in an engine start key. As is known, the transponder 13 is a transmitter-receiver which is capable of accepting the challenge of an interrogator and automatically transmitting an appropriate reply. The key is equipped with a transmitter for transmitting a code signal provided by the transponder 13. The "ESICS" 11 receives the code signal through an antenna 11A and compares the same with a code signal held by itself for judgment as to whether the combination of the key (viz., transponder 13) and the "ESICS" is proper or not. Even if a similar engine start key is prepared, the proper combination is not judged by the "ESICS" so long as the same transponder 13 is not installed in the key.

In the following, a first embodiment of the present invention will be described.

In the first embodiment, the interactive action between the "ECCS" 1 and the "ESICS" 11 takes place generally twice, one being at the time (A) when the ignition key cylinder is turned from "OFF" position to "ON" position, and the other being at the time (B) when the ignition key cylinder is turned from "ON" position to "OFF" position.

(A) Interactive action at the time when the key cylinder is turned from "OFF" position to "ON" position.

(a) A judgment is carried out as to whether, under the "ECCS" 1 permitting starting of the engine, a communication condition between the "ECCS" 1 and the "ESICS" 11 is established or not. For the establishment, the code signal held by the "ESICS" and that supplied by the transponder 13 (or key) should coincide with each other.

(b) When the communication condition is established, the communication between the "ESICS" and the "ECCS" is carried out. That is, a rolling code sent from the "ESICS" and a rolling code stored in an erasable and alterable ROM of the "ECCS" are compared.

(c) Upon agreement of the these rolling codes, the engine start permission is continued. While, upon disagreement of these codes, the engine start permission is canceled.

(B) Interactive action at the time when the ignition key cylinder is turned from position to "OFF" position.

(a) The "ECCS" sends a subsequent rolling code, which has been stored in the erasable and alterable ROM thereof, to the "ESICS".

(b) Upon receiving this subsequent rolling code, the "ESICS" stores it in the erasable and alterable ROM thereof, and sends the same back to the "ECCS".

(c) Upon receiving the sent back rolling code, the "ECCS" compares it with the subsequent rolling code which has been sent by the "ECCS" to the "ESICS", for ascertaining whether the two codes agree.

The rolling code is a code signal which is randomly changed each time the associated engine starts. However, this may induce that if, due to breakdown, the "ECU" of one of the "ECCS" and the "ESICS" is replaced with a new one, the engine start is not permitted due to disagreement of the rolling codes.

In order to deal with this matter, initialization of rolling code is effected to both the new "ECU" (for example, the new "ECU" newly installed in the "ECCS") and the lasting "ECU" (for example, the "ECU" kept in the "ESICS"), subject to the replaced "ECU" being new.

For this, each of the "ECCS" and "ESICS" has in the erasable and alterable ROM a flag which can represent that the "ECU" is new. That is, the flag is properly set at the factory of the electrical control units (ECU).

The program software for the "ECU" of each of the "ECCS" and "ESICS" has no operation step to set the flag to the new-article representing side. This is because the execution of the initialization should be permitted only when one of the "ECUs" of the "ECCS" and "ESICS" is replaced with a new one. That is, if the flag is freely handled by the program software, it becomes unknown whether the "ECU" is new or not.

When the "ECU" of either one of the "ECCS" and "ESICS" is replaced with a new one, the interactive action between the "ECCS" and the "ESICS" takes place twice, one being at the time (C) when the ignition key cylinder is turned from "OFF" position to "ON" position, and the other being at the time (D) when the key cylinder is turned from "ON" position to "OFF" position.

(C) Interactive action at the time when the ignition key cylinder is turned from "OFF" position to "ON" position.

(a) A judgment is carried out as to whether, under the "ECCS" permitting the engine start, a communication condition between the "ECCS" and the "ESICS" is established or not. For the establishment, a code signal held by the "ESICS" and a code signal supplied by the transponder 13 should coincide with each other.

(b) When the communication condition is established, a judgment is carried out as to which is new between the "ECUs" of the "ECCS" and the "ESICS" with reference the conditions of the flags stored therein.

Figure 2:
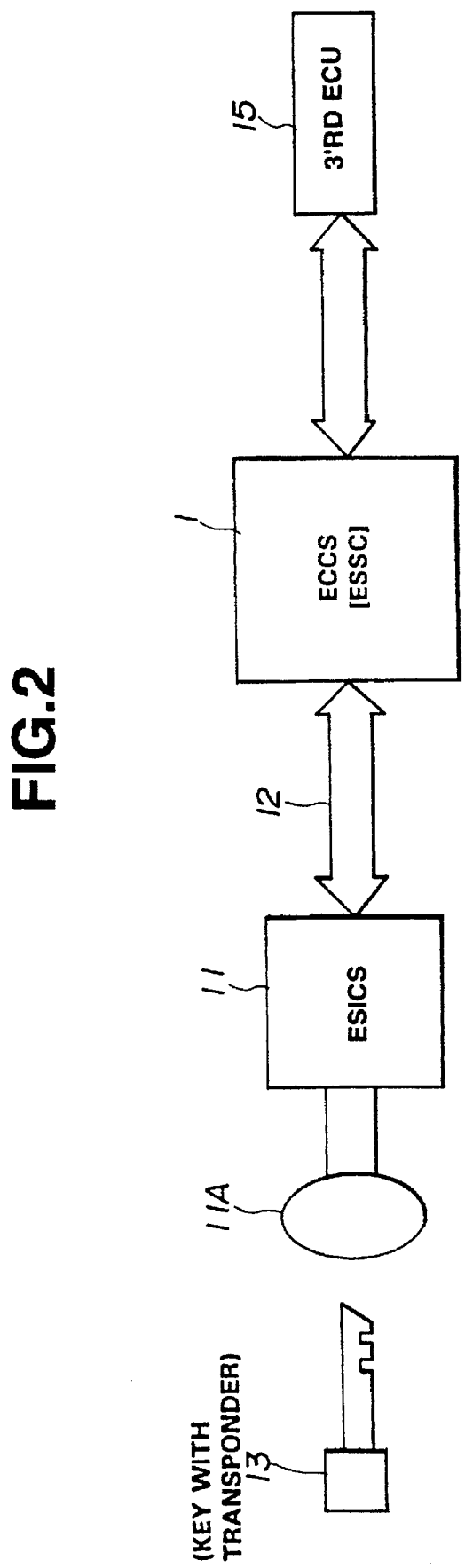
FIG. 2 is a block diagram of an anti-theft car protection system according to the present invention.

(c) When the judgment is so made that the "ECU" of the "ESICS" is new, an initialization order signal is issued to a third electrical control unit 15 (see FIG. 2). Then, the flag of the "ESICS" is reset.

(d) Upon issuance of the code initialization order from the third electrical control unit 15, the "ECU" of the "ECCS" feeds the "ESICS" with both a rolling code initialization start signal and a rolling code initialization code. Then, the flag of the "ECCS", which has been kept at the new article representing side, is reset or cleared out.

(e) After storing in its erasable and alterable ROM the rolling code initialization code sent from the "ECCS", the "ECU" of the "ECCS" sends back the same code to the "ECCS".

(f) The "ECU" of the "ECCS" compares the sent back code with the initialization code stored in the erasable and alterable ROM of the "ECCS".

(g) Upon agreement of the two initialization codes, the engine start permission is continued. While, upon disagreement of the codes, the engine start permission is canceled.

(D) Interactive action at the time when the ignition key cylinder is turned from "ON" position to "OFF" position.

(a) The "ECCS" sends a subsequent rolling code, which has been stored in the erasable and alterable ROM thereof, to the "ESICS".

(b) Upon receiving this subsequent rolling code, the "ESICS" stores it in the erasable and alterable ROM thereof, and sends the same back to the "ECCS".

(c) Upon receiving the sent back rolling code, the "ECCS" compares it with the subsequent rolling code which has been sent from the "ECCS" to the "ESICS", for ascertaining whether the two codes agree.

Figure 3:
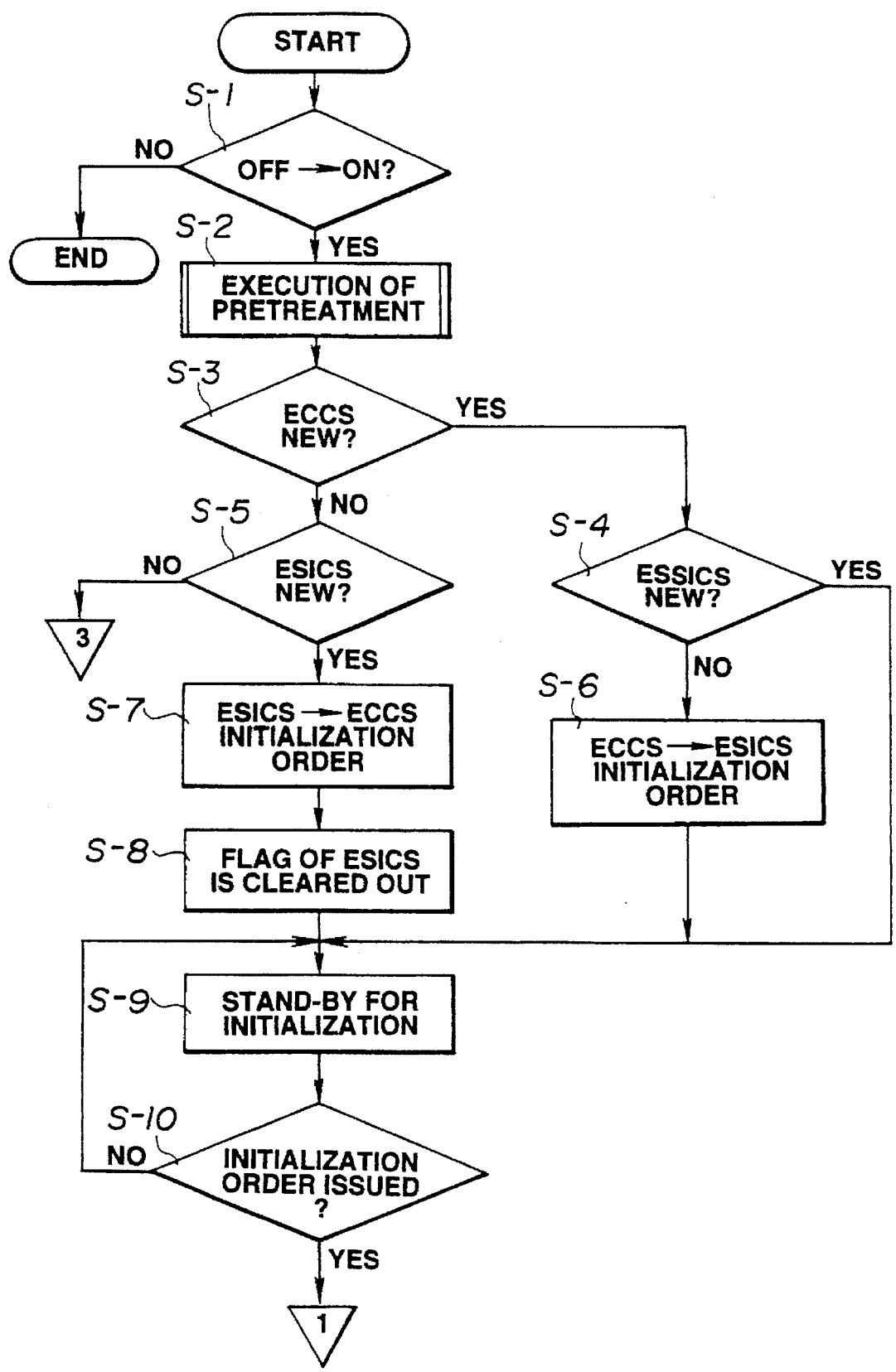
FIGS. 3 to 6 are flowcharts showing programmed operation steps carried out in a microcomputer used in a first embodiment of the present invention.
Figure 4:
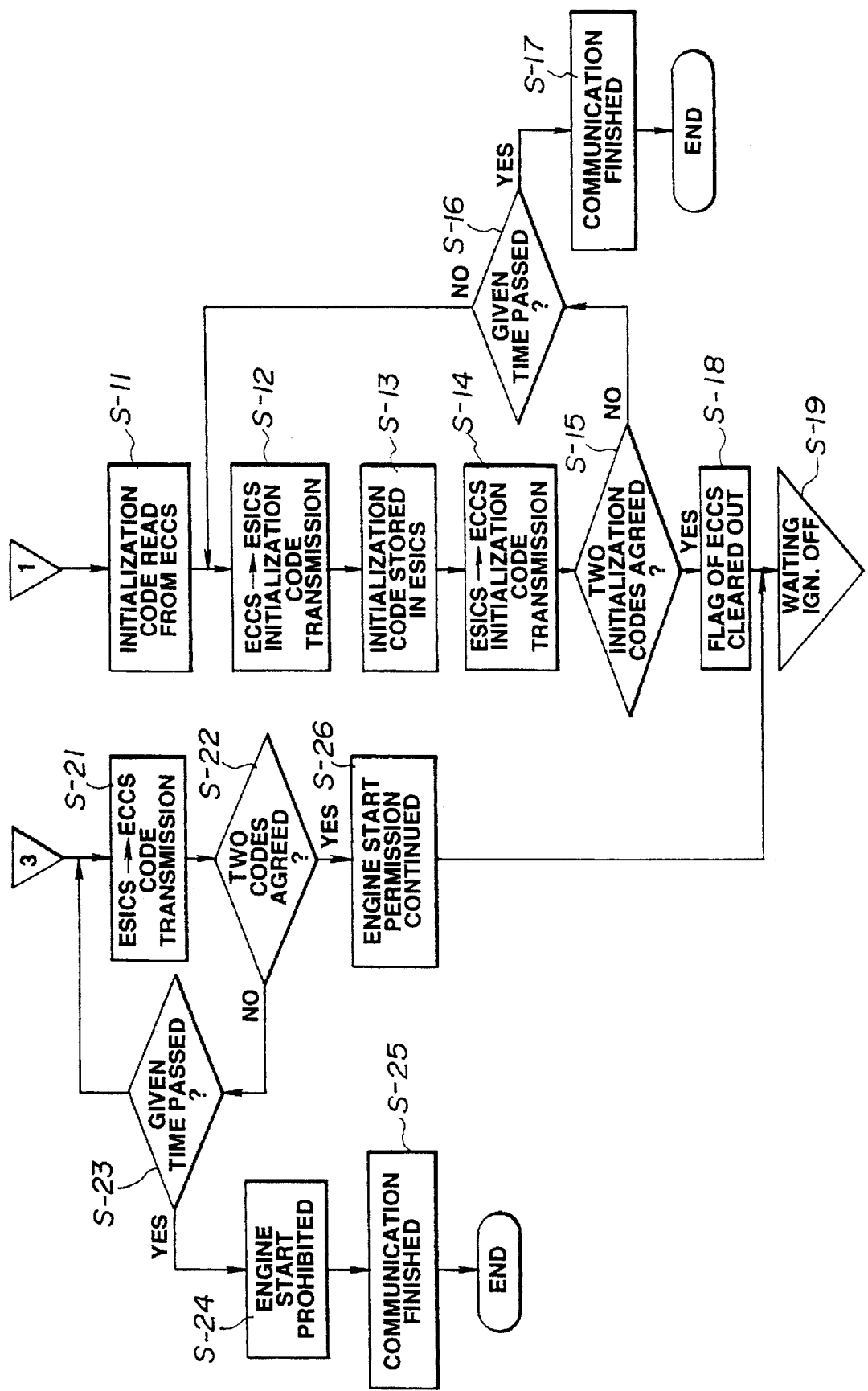
Figure 5:
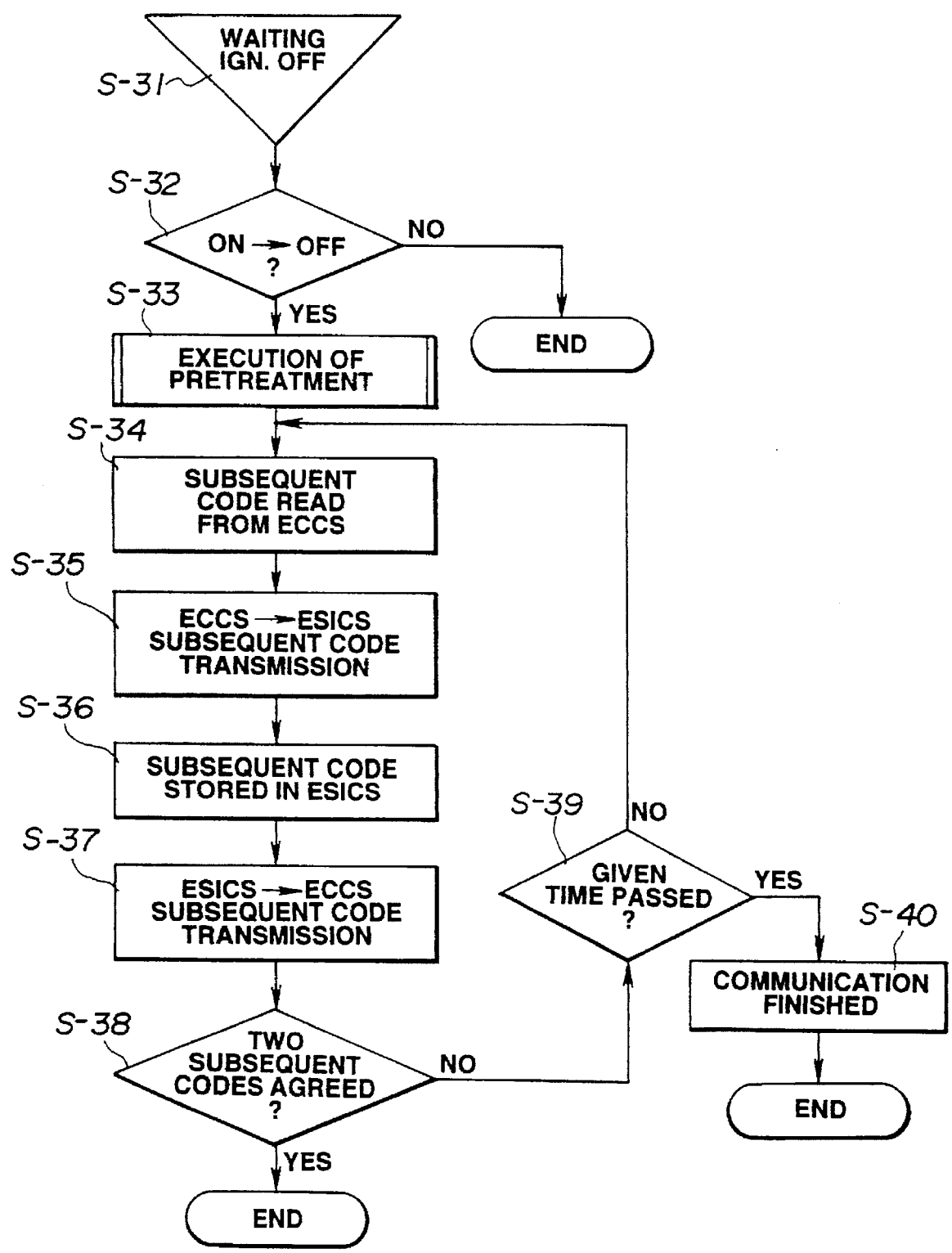

FIGS. 3, 4 and 5 are flowcharts which show programmed operation steps for carrying out the above-mentioned interactive actions.

As has been described hereinbefore, the communication between the "ECU" of the "ECCS" and the "ECU" of the "ESICS" is bi-directional. Thus, in order to send commands and data from the "ECCS" to the "ESICS" and send back the same to the "ESICS" from the "ECCS", it is necessary to provide two communication modes for such two directional communications.

In the flowchart of FIG. 3, at step S-1, a judgment is carried out as to whether or not the ignition key cylinder is turned from "OFF" position to "ON" position. If NO, the operation flow stops. While, if YES, the operation flow goes to step S-2. At this step, several operations needed for starting the communication are carried out. They are, for example, (1) instruction for communication between the "ECU" of the "ECCS" and that of the "ESICS", (2) communicating an establishment of the transmission condition to the "ECU" of the "ESICS" from the "ECU" of the "ECCS", (3) comparison between the code signal supplied by the "ESICS" and that from the transponder 13, and (4) communicating the result of the comparison to "ECU" of the "ECCS". If the comparison shows a disagreement of the two code signals, the communication is finished and the engine starting is suppressed.

At step S-3, a judgment is carried out as to whether the "ECU" of the "ECCS" is new or not, that is, whether or not a flag stored in the erasable and alterable ROM of the "ECU" of the "ECCS" has been set to represent the "ECU" being new. If YES, the operation flow goes to step S-4 where a judgment is carried out as to whether the "ECU" of the "ESICS" is new or not, that is, whether or not a flag stored in the erasable and alterable ROM of the "ECU" of the "ESICS" has been set to represent the "ECU" being new. If YES, the operation flow goes to step S-9 which will be described hereinafter. While, if NO, the operation flow goes to step S-6. At this step, an initialization order signal is issued from the "ECU" of the "ECCS" to that of "ESICS".

If YES at step S-5, the operation flow goes to step S-7. At this step, an initialization order signal is issued from the "ECU" of the "ESICS" to that of "ECCS", and then the operation flow goes to step S-8 where the flag of the "ESICS" is cleared out. Then, the operation flow goes to step S-9 where a rolling code initialization condition stands by. Then, at step S-10, a judgment is carried out as to whether the initialization order is issued or not. If NO, the operation flow goes back to step S-9, while, if YES, the operation flow goes to step S-11 of the flowchart of FIG. 4.

At step S-11, an initialization code stored in the erasable and alterable ROM of the "ECCS" is read, and then at step S-12, the initialization code thus read is transmitted to the "ECU" of the "ESICS". Then, at step S-13, the initialization code is stored in the erasable and alterable ROM of the "ESICS", and then at step S-14, an initialization code identical to the stored code is sent back to the "ECU" of the "ECCS". Then, the operation flow goes to step S-15. At this step, a judgment is carried out as to whether or not the sent back initialization code is in agreement with the initialization code which has been stored in the erasable and alterable ROM of the "ECCS". If NO, the operation flow goes back to step S-12 through a waiting step S-16, judging that some transmission error has occurred. That is, if, at step S-16, it is judged that a given time has not passed, the operation flow goes back to step S-12, while, if it is judged that the given time has passed, the operation flow goes to step S-17 to stop the communication.

If YES at step S-15, the operation flow goes to step S-18 to clear out or reset the flag of the "ECCS", and then the operation flow goes to step S-19. In this step, stand-by condition is kept until the key cylinder is turned from "ON" position to "OFF" position.

Then, the operation flow goes through step S-31 to step S-32 of the flowchart of FIG. 5. At this step, a judgment is carried out as to whether the ignition key cylinder is turned from "ON" position to "OFF" position. If YES, the operation flow goes to step S-33. At this step, several operations needed for starting the communication are carried out. They are, for example, (1) command communication between the "ECU" of the "ECCS" and that of the "ESICS", and (2) communicating an establishment of the transmission condition to the "ECU" of the "ESICS" to the "ECU" of the "ECCS". Then, the operation flow goes to steps S-34, S-35, S-36, S-37, S-38, S-39 and S-40 which are similar to the above-mentioned steps S-12 to S-17. However, the code handled by these steps S-34 to S-40 is a subsequent code appearing after the initialization code.

Referring back to the flowchart of FIG. 3, if NO at step S-5, the operation flow goes to step S-21 of the flowchart of FIG. 4. At this step, the rolling code stored in the erasable and alterable ROM of the "ESICS" is sent back to the "ECU" of the "ECCS". Then, at step S-22, a judgment is carried out as to whether or not the sent back rolling code is in agreement with the rolling code which has been stored in the erasable and alterable ROM of the "ECCS". If NO, the operation flow goes back to step S-21 through a waiting step S-23, judging that some communication error has occurred. That is, if, at step S-23, it is judged that a given time has not passed, the operation flow goes back to step S-21, while if it judged that the given time has passed, the operation flow goes to step 24 and step 25. At these steps, the engine starting is suppressed and the communication is finished respectively.

If YES at step S-22, the operation flow goes to step S-26. At this step, the engine start permission is continued and the operation flow goes to step S-19.

Figure 6:
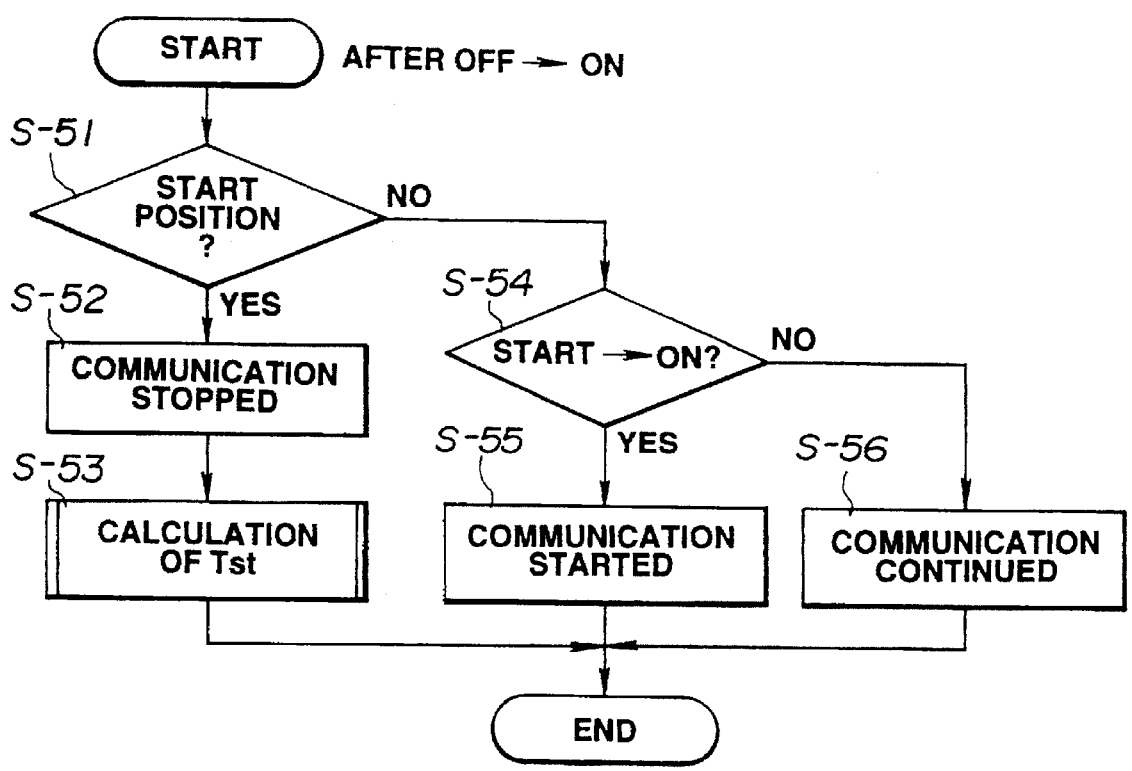

FIG. 6 shows a flowchart of operation steps which are carried out in the "ECU" of the "ECCS" for controlling the communication at the engine start.

That is, at step S-51, a judgment is carried out as to whether or not the ignition key cylinder comes to "START" position from "OFF" position. If YES, the operation flow goes to step S-52 to stop the communication, and the operation flow goes to step S-53. At this step, there is calculated the pulse width "Tst" of a control pulse signal which is to be applied to each of the fuel injection valves at the engine start.

The pulse width is calculated from the following equation:

$$Tst = Tst0 \times Csn \times Kcs \quad (1)$$

wherein:

Tst0: base value
Csn: rotation correction rate
Kcs: time correction rate

If NO at step S-51, the operation flow goes to step S-54. At this step, a judgment is carried out as to whether or not the ignition key cylinder is turned from "START" position to "ON" position. If YES, the operation flow goes to step S-55 to start or restart the communication. While, if NO, the operation flow goes to step S-56 to continue the communication.

In the following, advantageous operation of the anti-theft car protection system of the first embodiment of the invention will be briefly described.

When, for starting the engine, the ignition key cylinder is turned from "OFF" position to "ON" position, the "ECCS" compares its own rolling code and a rolling code sent back thereto from the "ESICS", while permitting the engine start. However, if these two rolling codes fail to agree, the engine start is suppressed.

When, for stopping the engine, the ignition key cylinder is turned from "ON" position to "OFF" position, the rolling codes stored in the "ECUs" of the "ECCS" and "ESICS" are renewed or subjected to rolling. Because the renewal of the rolling codes is effected when the engine is stopped, the rolling error of the codes can be minimized.

In the "ECU" of the "ESICS", the code signal stored therein and the code signal supplied from the transponder 13 are compared for judging whether the engine start key having the transponder 13 installed therein is proper or not. That is, only when these two code signals agree proving that the key is proper, the communication condition becomes established between the "ECCS" and the "ESICS". Thus, a proper and limited combination between the key and the "ESICS" is required for practically starting the engine.

When the anti-theft car protection system fails to operate due to breakdown of the "ECU" of either one of the "ECCS" and "ESICS", it is only necessary to replace the broken down "ECU" with a new one. That is, in such case, in the invention, initialization process is executed in both the new and existing "ECUs" of the "ECCS" and "ESICS". Such replacement is economical as compared with a replacement of both "ECUs" of the "ECCS" and "ESICS".

In the following, a second embodiment of the present invention will be described.

Also, in this second embodiment, the interactive action between the "ECCS" and the "ESICS" takes place generally twice, one being at the time (A) when the key cylinder is turned from "OFF" position to "ON" position, and the other being at the time (B) when the key cylinder is turned from "ON" position to "OFF" position.

(A) Interactive action at the time when the ignition key cylinder is turned from "OFF" position to "ON" position.
  (a) A judgment is carried out as to whether a communication between the "ESICS" 11 and the transponder 13 is possible or not. If not, that is, if the communication can not be achieved for a given time, an instruction signal is produced for suppressing starting of the engine.
  (b) A judgment is carried out as to whether, under the "ECCS" 1 permitting starting of the engine, a communication condition between the "ECCS" 1 and the "ESICS" 11 is established or not. For the establishment, the code signal supplied by the "ESICS" and the code signal supplied by the transponder 13 should be coincident with each other.
  (C) When the communication condition is established, the communication between the "ESICS" 11 and the "ECCS" 1 is carried out. That is, an identification code sent from the "ESICS" 11 and an identification code stored in an erasable and alterable ROM of the "ECCS" 1 are compared. The ROM is of a type which, upon instruction from CPU, can store data without specified power source.
  (d) Upon agreement of these identification codes, the engine start permission is continued. While, upon disagreement of the codes, the engine start permission is canceled.
(B) Interactive action at the time when the ignition key cylinder is turned from "ON" position to "OFF" position.
  (a) The "ECCS" 1 issues an identification code renewing order to the "ESICS" 11.
  (b) Upon receiving this order, the "ESICS" 11 selects a new identification code randomly and stores it in the erasable and alterable ROM thereof and sends the same back to the "ECCS" 1.
  (c) Upon receiving the sent back new identification code, the "ECCS" 1 stores it in its erasable and alterable ROM.

Thus, the identification code is changed each time the ignition key cylinder is turned from "ON" position to "OFF" position. However, this may induce that if, due to breakdown, the "ECU" of one of the "ECCS" and the "ESICS" is replaced with a new one, the engine start is not permitted due to disagreement of the identification codes.

In order to deal with this matter, an initialization process is effected to achieve synchronization of the identification code between the new "ECU" (for example, the new "ECU" newly installed in the "ECCS" 1) and the lasting "ECU" (for example, the "ECU" kept in the "ESICS" 11). This initialization process is carried out in a third electrical control unit 15 as shown in FIG. 2.

For this, each of the "ECCS" 1 and the "ESICS" 11 has in the erasable and alterable a flag which can represent that the "ECU" is new. That is, the flag is properly set at the factory of the electrical control units (ECU).

The program software for the "ECU" of each of "ECCS" 1 and the "ESICS" 11 has no operation step to set the flag to a side representing that the "ECU" is new. This is because the execution of the initialization should be permitted only when one of the "ECUs" of the "ECCS" 1 and the "ESICS" 11 is replaced with a new one. That is, if the flag is freely handled by the program software, it becomes unknown whether the "ECU" is new or not.

When the "ECU" of either one of the "ECCS" and "ESICS" 11 is replaced with a new one, the interactive action between the "ECCS" 1 and the "ESICS" 11 takes place twice, one being at the time (C) when the ignition key cylinder is turned from "OFF" position to "ON" position, and the other being at the time (D) when the key cylinder is turned from "ON" position to "OFF" position.

(C) Interactive action at the time when the ignition key cylinder is turned from "OFF" position to "ON" position.

(a) A judgment is carried out as to whether a communication condition between the "ECCS" 1 and the "ESICS" 11 is established or not. For the establishment, a code signal supplied by the "ESICS" 11 and a code signal supplied by the transponder 13 should be coincident with each other.

(b) When the communication condition is established, connection of the "ECCS" 1 to the third "ECU" 15 is permitted subject to a condition wherein at least one of the "ECUs" of the "ECCS" 1 and the "ESICS" 11 has the flag representing that the corresponding "ECU" is new.

(c) Upon connection, an initialization order is issued from the third "ECU" 15 to the "ECCS" 1. Upon this, the "ECCS" 1 issues an initialization order to the "ESICS" 11. Upon this, the "ESICS" 11 selects an initial identification code and stores it in the erasable and alterable ROM thereof and at the same time the "ESICS" sends the code to the "ECCS" 1.

(d) Upon receiving the sent back initial identification code, the "ECCS" 1 stores it in its erasable and alterable ROM.

(e) The flag in the ROM of the "ECCS" 1 or the "ESICS" 11 is cleared out.

(D) Interactive action at the time when the ignition key cylinder is turned from "ON" position to "OFF" position.

(a) The "ECCS" 1 issues an identification code renewing order to the "ESICS" 11.

(b) Upon receiving this order, the "ESICS" 11 selects a new identification code randomly and stores it in the erasable and alterable ROM thereof and sends the same back to the "ECCS" 1.

(c) Upon receiving the sent back new identification code, the "ECCS" 1 stores it in its erasable and alterable ROM.

Figure 7:
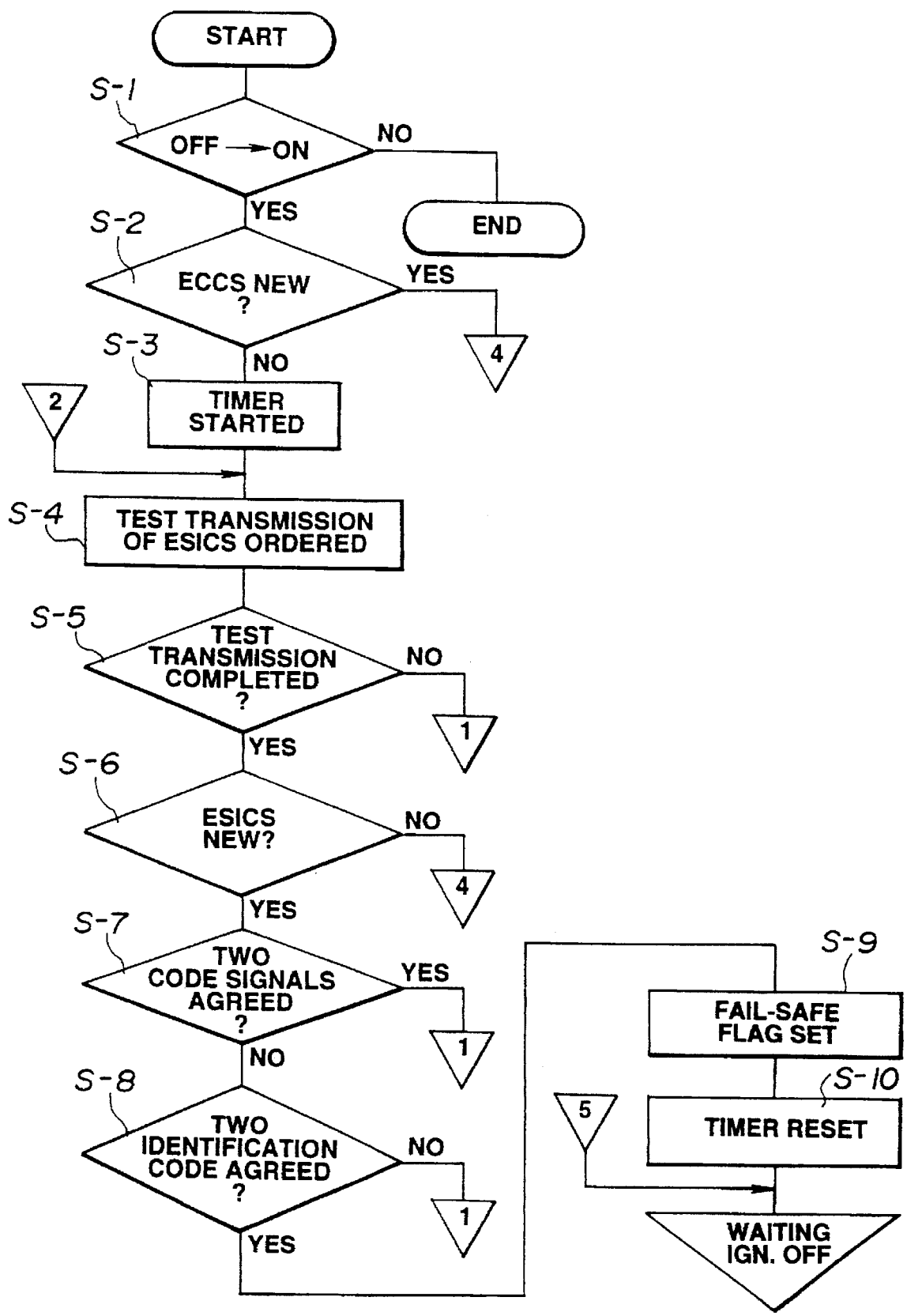
Figure 8:
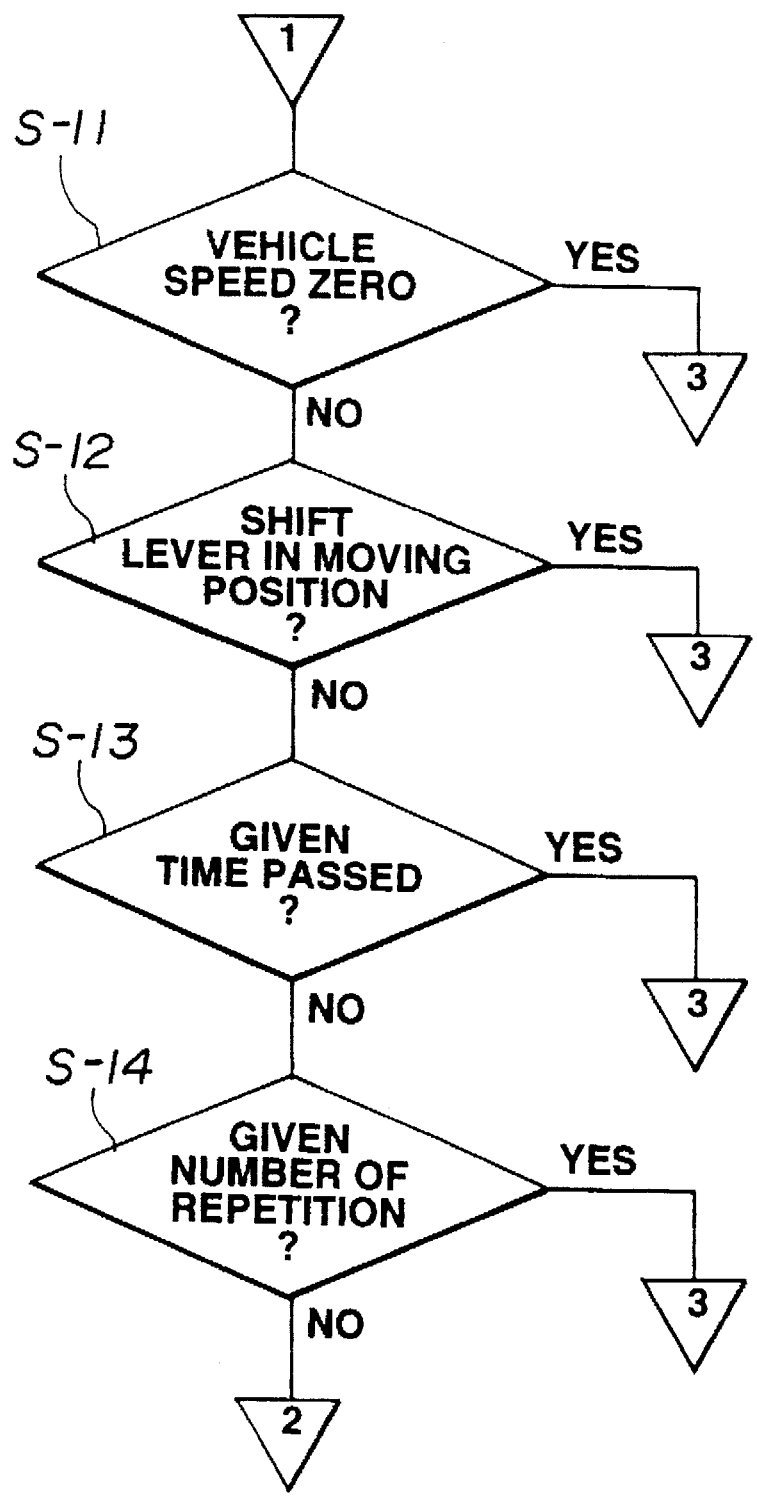
Figure 9:
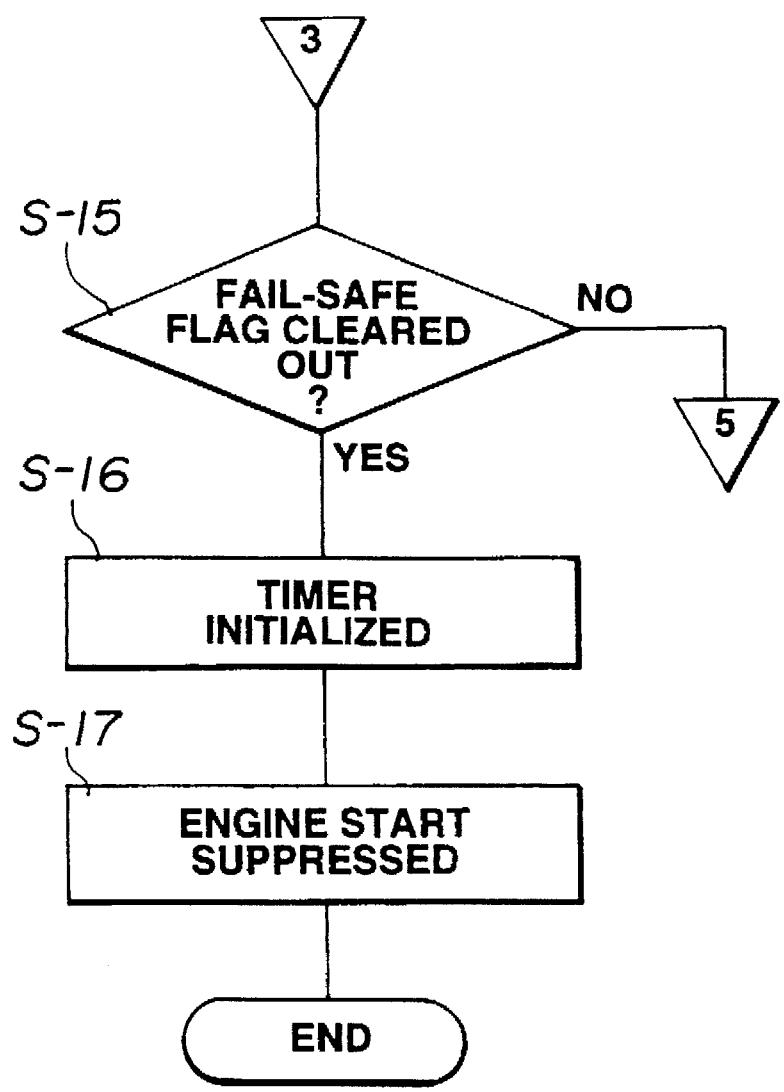
Figure 10:
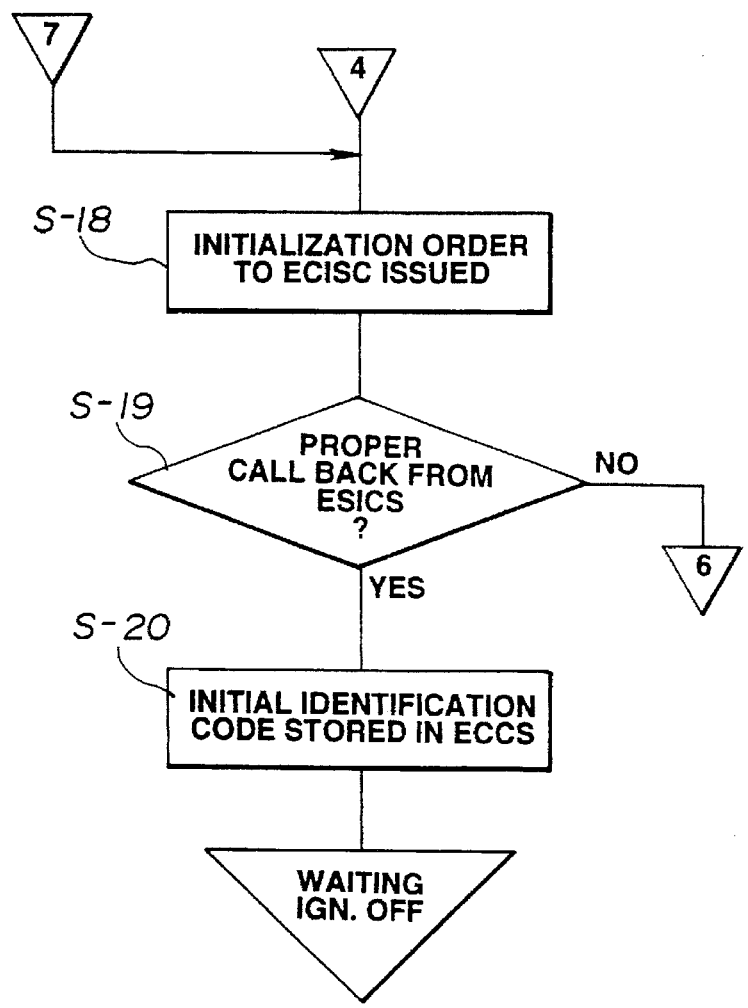
Figure 11:
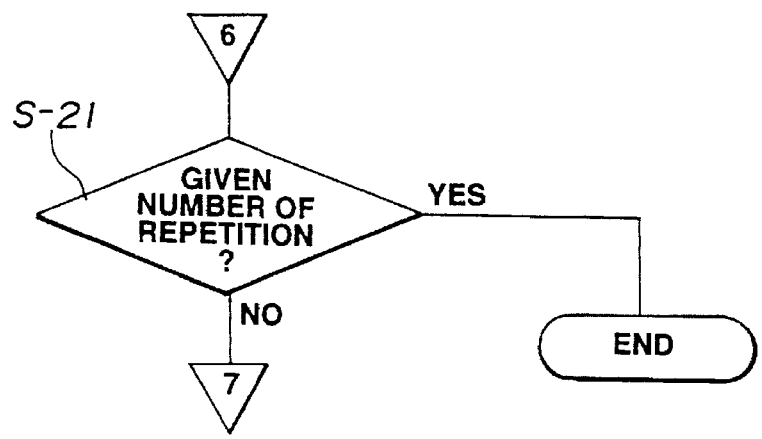
Figure 12:
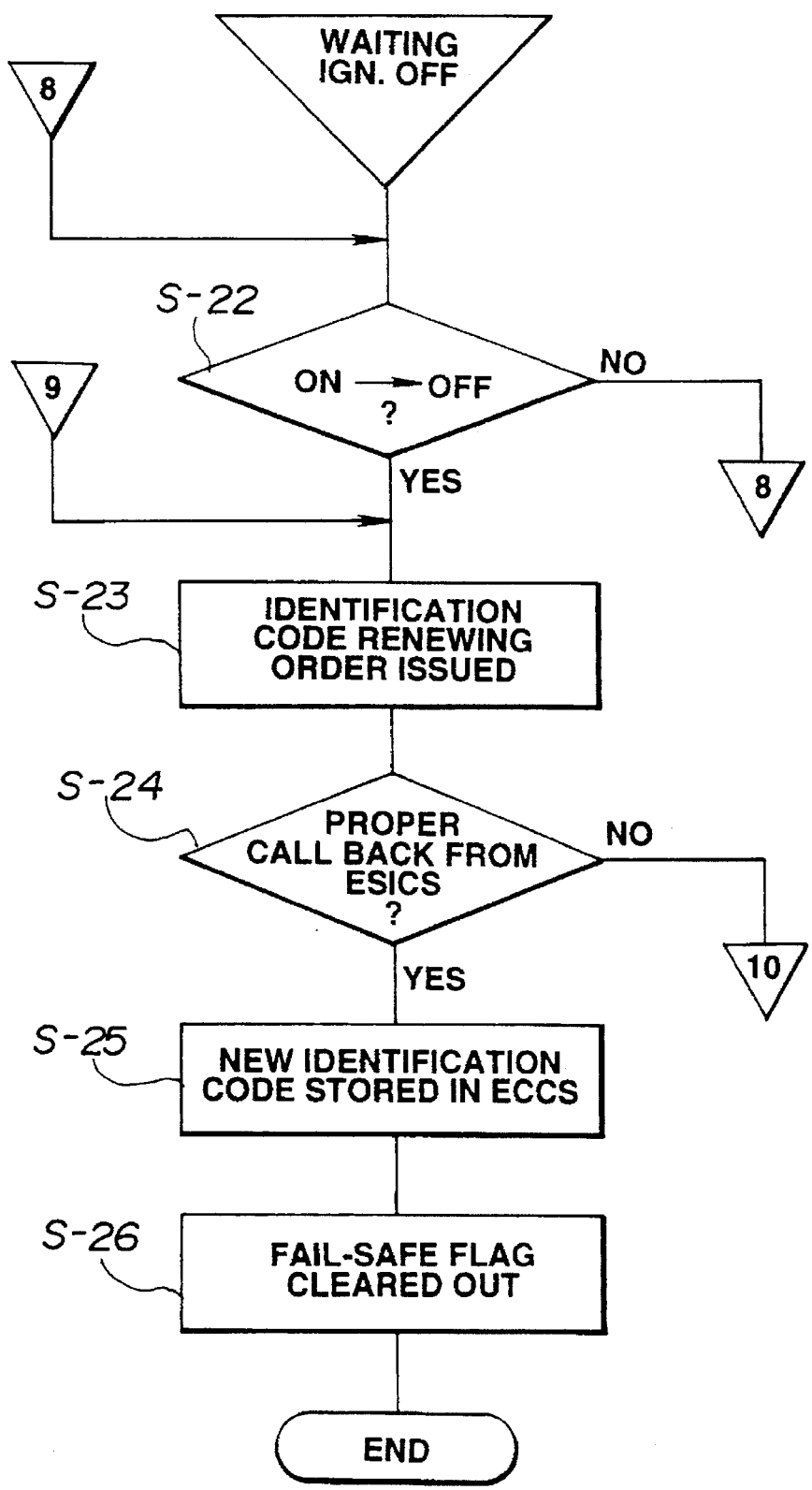

FIGS. 7, 8 and 9 are flowcharts which show programmed operation steps for carrying out the interactive action of (A), FIGS. 12 and 13 are flowcharts which show programmed operation steps for carrying out the interactive action of (B) and (D), and FIGS. 10 and 11 are flowcharts which show programmed operation steps for carrying out the interactive action of (C).

In the flowchart of FIG. 7, at step S-1, a judgment is carried out as to whether an ignition key cylinder is turned from "OFF" position to "ON" position or not. If NO, the operation flow stops. While if YES, the operation flow goes to step S-2. At this step, a judgment is carried out as to whether or not the "ECCS" is new, that is, whether or not the erasable and alterable ROM of the "ECCS" has the flag which represents that the corresponding "ECU" is new. If YES, the operation flow goes to the initialization process depicted by the flowchart of FIG. 10, which process will be described hereinafter.

If NO at step S-2, the operation flow goes to step S-3 and a timer starts to count a time. Then, the operation flow goes to step S-4. At this step, an order is directed to the "ESICS" to effect a test transmission. Then, the operation flow goes to step S-5. At this step, a judgment is carried out as to whether or not the "ESICS" actually effects the test transmission. If NO, that is, if the "ESICS" does not effect call back, or if the checksum shows an error even when the call back is effected, the operation flow goes to a process depicted by the flowchart of FIG. 8. As will be described hereinafter, after executing the steps of the flowchart of FIG. 8, the operation flow goes back to step S-4 of FIG. 7 or goes to the engine start suppressing process of FIG. 9. If the engine start suppressing process is established, fuel supply to the engine is stopped.

Referring back to the flowchart of FIG. 7, if YES at step S-5, that is, if the "ESICS" effects the call back, the operation flow goes to step S-6. At this step, a judgment is carried out as to whether the "ESICS" is new or not, that is, whether or not the erasable and alterable ROM of the "ESICS" has the flag which represents that the corresponding "ECU" is new. If YES, the operation flow goes to the initialization process of FIG. 10 which will be described hereinafter. If NO, the operation flow goes to step S-7. At this step, a judgment is carried out as to whether the code signal emitted from the transponder 13 and the code signal supplied by the "ESICS" are coincident with each other or not. If YES, the operation flow goes to step S-8. At this step, the identification code emitted from the transponder 13 and that provided by the "ESICS" are compared to judge whether or these two codes coincide with each other. For this step, the "ECCS" orders the "ESICS" to send the identification code to the "ECCS", and upon receiving the code, the "ECCS" compares the code with its own identification code. If YES at step S-8, the operation flow goes to step S-9. At this step, a fail-safe flag is set, and then at step S-10, the timer is initialized or reset to zero.

Under normal condition, the anti-theft car protection at the engine start is carried out in the above-mentioned manner. Thus, thereafter, a stand-by condition is kept until the key cylinder is turned from "ON" position to "OFF" position.

If NO is issued at step S-5, S-7 or S-8, the operation flow goes to the process of FIG. 8. At this process, at first (step S-11), a judgment is carried out as to whether the vehicle speed is zero or not. If NO, that is, when the vehicle is moving, the operation flow goes to step S-12. At this step, a judgment is carried out as to whether or not a shift lever is kept in one of the vehicle moving positions. If NO, that is, if the shift lever is kept in one vehicle moving position (for example, "D" position), the operation flow goes to step S-13. At this step, a judgment is carried out as to whether or not the time counted by the timer at step S-3 exceeds a given time. If NO, that is, when the counted time is within the given time, the operation flow goes to step S-14. At this step, a judgment is carried out as to whether or not the number of repetition of the process of FIG. 8 exceeds a given number. If NO, that is, when the repetition number is within the given number, the operation flow goes back to step S-4 of the flowchart of FIG. 7.

If YES is issued at step S-11, S-12, S-13 or S-14, the operation flow goes to the process of FIG. 9. At this process, at first (step S-15), a judgment is carried out as to whether or not the fail-safe flag is cleared out. If NO, that is, when the fail-safe flag is kept set, the operation flow induces the above-mentioned state wherein the "ESICS" and "ECCS" stand by for instructions until the key cylinder is turned from "ON" position to "OFF" position. While, if YES, that is, when the fail-safe flag is cleared out, the operation flow goes to step S-16. At this step, the timer is initialized or reset to zero. Then, the operation flow goes to step S-17 for suppressing the engine starting.

It is to be noted that the branched operation flow from S-5, S-7 or S-8 of FIG. 7 to S-15 of FIG. 9 through the process of FIG. 8 includes no step for setting the fail-safe flag. Thus, the step S-15 always judges clearing of the fail-safe flag. Accordingly, the engine start suppression assuredly takes places when the "ESICS" fails to effect a proper call back (S-5), a mismatch occurs between the code signal from the transponder 13 and that from the "ESICS" (S-7) or a mismatch occurs between the identification code from the transponder 13 and the code of the "ECCS".

It is further to be noted that the step S-9 (viz., fail-safe flag setting) is provided for carrying out the anti-theft car protection checking at only the engine starting. Thus, even if, due to trouble of the computer, the process of FIG. 7 is executed during cruising of the vehicle, fuel cut to the engine never occurs. 15 The fail-safe flag is set at step S-9 of FIG. 7, and cleared out at step S-26 of an after-mentioned engine stop process of FIG. 12. That is, the fail-safe flag is not set until the anti-theft car protection checking at the engine starting is cleared. Accordingly, if the anti-theft car protection checking is executed during the vehicle cruising, the fuel cut to the engine does not occur so long as the step S-15 finds that the fail-safe flag has been set.

FIG. 12 is a flowchart showing the process executed when the engine operation is stopped. That is, at step S-22, a judgment is carried out as to whether or not the ignition key cylinder is turned from "ON" position to "OFF" position. If YES, that is, when the key cylinder is turned to "OFF" position, the operation flow goes to step S-23. At this step, the "ECCS" issues an identification code renewing order to the "ESICS" together with a new identification code. Then, the operation flow goes to step S-24. At this step, a judgment is carried out as to whether or not the "ESICS" makes a proper call back to the renewing order. If NO, that is, when the "ESICS" does not effect the call back, the operation flow goes to a step S-27 of the process of FIG. 13. At this step, a judgment is carried out as to whether the number of repetition of the call back order exceeds a given number. If YES, that is, when the repetition number exceeds the given number, the process is ended. If NO, that is, when the repetition number is within the given number, the operation flow goes back to step S-23 of FIG. 12.

If YES at step S-24, that is, when the "ESICS" effects a proper call back, the "ECCS" stores the new identification code in the erasable and alterable ROM thereof (S-25). Then, at step S-26, the fail-safe flag is cleared out and its process is ended.

Accordingly, in a subsequent engine starting, the renewed identification code is used for the anti-theft car protection.

In the following, an initialization process executed when one of the "ECCS" and the "ESICS" is new will be described with reference to the flowcharts of FIGS. 6 and 7.

That is, if YES is issued at step S-2 or S-6, the operation flow goes to the initialization process of FIG. 10. That is, at step S-18, the "ECCS" issues an initialization order to the "ESICS". This initialization order is issued in response to an order from the third "ECU" 15 (see FIG. 2) to the "ECCS". Upon receiving the initialization order from the "ECCS", the "ESICS" selects an initial identification code and stores it therein. Then, at step S-19, a judgment is carried out as to whether or not the "ESICS" makes a proper call back to the "ECCS". If NO, that is, when the "ESICS" does not effect the proper call back, the operation flow goes to step S-21 of the process of FIG. 11. At this step, a judgment is carried out as to whether the number of repetition of the process of FIG. 10 exceeds a given number. If NO, that is, when the repetition number is within the given number, the operation flow goes back to step S-18. While, if YES, that is, when the repetition number exceeds the given number, the process is ended.

If YES at step S-19, that is, when the "ESICS" effects the proper call back to the "ECCS", the operation flow goes to step S-20. At this step, the "ECCS" stores the sent back initial identification code in the erasable and alterable ROM thereof. The process of FIG. 10 has no step for comparing the identification codes. That is, the engine start is permitted without experiencing the code comparison. Of course, in a subsequent engine starting, the comparison of the identification codes is carried out.

FIG. 14 is a table showing various codes which are actually transmitted between the "ECCS" and the "ESICS". As is seen from this table, each code is a 8-bit binary code.

FIG. 15 is a table showing protocol formats through which the various codes are transmitted. That is, for example, the comparison of the identification codes is carried out in the following. For the transmission from the "ECCS" to the "ESICS", 24 bits signal is used, which consists of 8 bits code for the code renewing order (see FIG. 14), 8 bits code for a fixed value and 8 bits code for checksum. For providing the checksum, the 8 bits data of the command and those of the fixed value are each divided into various digits and added for each digit. By collating the checksum, communication error can be checked. While, for the transmission from the "ESICS" to the "ECCS", 24 bits signal is used, which consists of 8 bits code for code registration order (see FIG. 14), 8 bits code for the identification and 8 bits code for checksum.

In the following, advantageous operation of the anti-theft car protection system of the second embodiment will be briefly described.

When, for starting the engine, the ignition key cylinder is turned from "OFF" position to "ON" position, the "ECCS" compares its own identification code and an identification code sent back thereto from the "ESICS", while permitting the engine start. If these two identification codes fail to coincide, the engine start is suppressed.

When, for stopping the engine, the ignition key cylinder is turned from "ON" position to "OFF" position, the identification codes of the "ECCS" and the "ESICS" are renewed. Thus, each time the engine starts, the renewed identification codes are compared. Thus, if the "ECU" of the "ECCS" or that of the "ESICS" is replaced with a different "ECU" which has been used in another vehicle, the engine start is not permitted due to disagreement of the identification codes. This means protection of anti-theft car. If desired, the renewal of the identification codes of the "ECCS" and "ESICS" may be effected after starting of the engine.

In the "ECU" of the "ESICS", the code signal stored therein and the code signal supplied from the transponder 13 are compared for judging whether the engine start key having the transponder 13 installed therein is proper or not. That is, only when these two code signals coincide proving that the key is proper, the communication condition becomes established between the "ECCS" and the "ESICS". Thus, a proper and limited combination between the key and the "ESICS" is required for practically starting the engine.

When the anti-theft car protection system fails to operate due to breakdown of the "ECU" of either one of the "ECCS" and "ESICS", it is only necessary to replace the broken down "ECU" with a new one. That is, in such case, in the invention, initialization process is executed in both the new and existing "ECUs" of the "ECCS" and "ESICS". Such replacement is economical as compared with a replacement of both "ECUs" of the "ECCS" and "ESICS".

Due to provision of the step S-9 (viz., fail-safe flag setting), unexpected fuel cut to the engine during vehicle cruising does not occur.

What is claimed is:

1. A method of operating an anti-theft car protection system for a motor vehicle powered by an engine, said system including a first control unit which controls the fuel injection to the engine and is capable of starting the engine responsive to an engine start instruction signal and of storing a first rolling code and a second control unit which is capable of storing a second rolling code, the method comprising the steps of:

storing said first and said second rolling codes for said first and said second control units respectively;

issuing an "ON" signal when an ignition switch of the vehicle is turned from an "OFF" position to an "ON" position and issuing an "OFF" signal when the ignition switch is turned from the "ON" position to the "OFF" position;

providing said first control unit with said second rolling code responsive to the "ON" signal; and comparing said first and said second rolling codes, and issuing an agreement signal if the first and the second rolling codes are in agreement and issuing a disagreement signal if the first and the second rolling codes are in disagreement;

feeding the engine start instruction signal to said first control unit responsive to said agreement signal, and preventing the feeding of the engine start instruction signal to said first control unit responsive to said disagreement signal;

setting a fail-safe flag responsive to issuance of said agreement signal;

clearing out said fail-safe flag responsive to said "OFF" signal; and preventing suppression of the engine starting when said fail-safe flag is set.

2. A method as claimed in claim 1, further comprising the step of:

changing said first and said second rolling codes upon receiving said "OFF" signal.

3. A method as claimed in claim 1, wherein said second unit is capable of storing a key code and, further comprising the steps of:

issuing a key code signal when the ignition switch is turned from the "OFF" position to the "ON" position;

comparing said key code and said key code signal and issuing a key agreement signal if the key code and the key code signal are in agreement;

issuing a condition establishing signal responsive to said key agreement signal; and actuating an interactive communications line between the first and the second control units for transmitting said second rolling code to said first control unit responsive to said condition establishing signal.

4. A method of operating an anti-theft car protection system for a motor vehicle powered by an engine, said system including a first control unit which controls the fuel injection to the engine and is capable of starting the engine responsive to an engine start instruction signal and of storing a first rolling code and a second control unit which is capable of storing a second rolling code, the method comprising the steps of:

issuing an "ON" signal when an ignition key cylinder of the vehicle is turned from an "OFF" position to an "ON" position;

issuing, to said first control unit, said engine start instruction signal and a new unit representing signal when one of said first and said second control units is new; and initializing said first and said second rolling codes responsive to said new unit representing signal.

5. A method for operating an anti-theft car protection system for a motor vehicle powered by an engine, the system including a first control unit capable of storing a first identification code and a second control unit capable of storing a second identification code, said second and said first control units being connected through an interactive communication line, the method comprising the steps of:

issuing an "ON" signal when an ignition switch of the vehicle is turned from an "OFF" position to an "ON" position for instructing starting of the engine and issuing an "OFF" signal when the ignition switch is turned from the "ON" position to the "OFF" position;

responsive to said "ON" signal, comparing said first and said second identification codes, and issuing a disagreement signal if said first and said second identification codes disagree and an agreement signal if said first and said second identification codes agree;

setting a fail-safe flag responsive to issuance of said agreement signal;

clearing out said fail-safe flag responsive to said "OFF" signal;

preventing suppression of the engine starting when said fail-safe flag is set;

suppressing starting of the engine responsive to issuance of said disagreement signal only if said fail-safe flag is cleared; and changing said first and said second identification codes after starting of said engine.

6. A method as claimed in claim 5, further comprising the steps of:

detecting an error in communication between said first and said second control units through said interactive communication line; and suppressing starting of the engine responsive to detection of the communication error.

7. A method as claimed in claim 5, further comprising the steps of:

issuing a time-over signal when a given time passes after issuance of said "ON" signal; and suppressing the starting of the engine responsive to said time-over signal and only if said time-over signal issues prior to issuance of said agreement signal.

8. A method as claimed in claim 7, in which said given time begins at the time at which said ignition switch is turned to the "ON" position from the "OFF" position.

9. A method as claimed in claim 7, in which said given time begins at the time at which the engine starts.

10. A method as claimed in claim 7, in which said given time begins at the time at which communications between said first and said second control units start.

11. A method as claimed in claim 5, further comprising the steps of:

issuing a non-neutral signal when the vehicle is not in a neutral condition and after issuance of said "ON" signal; and suppressing the starting of the engine responsive to issuance of said non-neutral signal and only if the non-neutral signal issues prior to issuance of said agreement signal.

12. A method as claimed in claim 5, wherein said second control unit is capable of storing a key code and, further comprising the steps of:

issuing a key code signal when said ignition switch is turned from the "OFF" position to the "ON" position;

issuing a condition establishing signal if said key code signal and said key code agree; and allowing the comparison between the first and the second identification codes only after issuance of said condition establishing signal.

13. A method as claimed in claim 12, further comprising the step of:

suppressing the starting of the engine after issuance of said "ON" signal and until determining that said key code and said code signal agree.

14. A method as claimed in claims 12, further comprising the steps of:

issuing a time-over signal when a given time passes after issuance of said "ON" signal; and suppressing the starting of the engine responsive to said time-over signal if said time-over signal issues prior to determining that said key code and said key code signal agree.

15. A method as claimed in claim 14, wherein said given time begins at the time at which said ignition key cylinder is turned to "ON" position from "OFF" position.

16. A method as claimed in claim 14, wherein said given time begins at the time at which the engine starts.

17. A method as claimed in claim 14, wherein said given time begins at the time at which communications between said first and second control units start.

18. A method as claimed in claims 12, further comprising the steps of:

issuing a non-neutral signal when the vehicle is not in a neutral condition and after issuance of said "ON" signal; and suppressing the starting of the engine responsive to issuance of said non-neutral signal only if the non-neutral signal issues prior to determining that said key code and said key code signal agree.

19. A method as claimed in claim 5, further comprising the steps of:

issuing a new unit representing signal upon issuance of said "ON" signal when one of said first and said second control units is new; and initializing the first and the second identification codes responsive to said new unit representing signal.

20. A method as claimed in claim 19, wherein said issuing of said new unit representing signal includes a flag operative with the first and the second control units, said flag being cleared out responsive to said new unit representing signal.

21. An anti-theft protection system for a motor vehicle powered by an engine comprising:

an ignition switch for issuing an "ON" signal responsive to being turned from an "OFF" to an "ON" position and for issuing an "OFF" signal responsive to being turned from the "ON" to the "OFF" position;

an engine start inhibiting unit having a first rolling code stored therein for transmitting said first rolling code responsive the issuance of said "ON" signal and operative to transmit an engine start instruction signal;

a central control unit, operative to control fuel injection to the vehicle engine and to set a fail-safe flag to prevent suppression of said fuel injection and to clear said fail-safe flag, having a second rolling code stored therein, for comparing said transmitted first rolling code with said second rolling code, and transmitting either a first comparison signal if said first rolling code agrees with said second rolling code or a second comparison signal if said first rolling code does not agree with said second rolling code; and a communications link connecting said engine start inhibiting unit and said central control unit for communicating said transmitted first rolling code from said engine start inhibiting unit to said central control unit, said transmitted comparison signal from said central control unit to said engine start inhibiting unit and said transmitted engine start instruction signal from said engine start inhibiting unit to said central control unit;

wherein said engine start inhibiting unit is operated to transmit said engine start instruction signal only if the transmitted comparison signal is said first comparison signal and responsive thereto, and said central control unit is operated to allow fuel injection to the vehicle engine responsive to said transmitted engine start instruction signal and to set said fail-safe flag only if said transmitted comparison signal is the first comparison signal and to clear said fail-safe flag responsive only to issuance of said "OFF" signal.

22. An anti-theft protection system for a motor vehicle according to claim 21, further comprising an electrical control unit for transmitting an initializing signal to said engine start inhibiting unit to initialize said first rolling code and to said central control unit to initialize said second rolling code responsive to a new unit representing signal from and indicative of the replacement of either said engine start inhibiting unit or said central control unit.

23. An anti-theft protection system for a motor vehicle according to claim 21, wherein said central control unit is operative to detect an error in signals communicated over said communications link between said engine start inhibiting unit and said central control unit and to suppress fuel injection to the vehicle engine responsive to said error detection.

24. An anti-theft protection system for a motor vehicle according to claim 21, wherein:

said engine start inhibiting unit is operative to transmit a time-over signal after passage of a time period following issuance of said "ON" signal and responsive to the transmitted comparison signal if said transmitted comparison signal is the second comparison signal; and said central control unit is operative to suppress fuel injection to the vehicle engine responsive to said transmitted time-over signal.

25. An anti-theft protection system for a motor vehicle according to claim 21, wherein said central control unit is operative to suppress fuel injection to the vehicle engine after issuance of said "ON" signal and prior to the first comparison signal being transmitted, responsive to a signal indicative of a transmission of the vehicle being in a non-neutral operating condition.

26. An anti-theft protection system for a motor vehicle according to claim 21, further comprising an ignition key for turning said ignition switch and including a transponder for transmitting a key code signal when said ignition switch is turned from the "OFF" to the "ON" position wherein:

said engine start inhibiting unit has a key code stored therein and is operative to compare said transmitted key code signal with said key code, and to issue a condition establishing signal if said key code and said key code signal are in agreement; and said communications link communicates said transmitted first rolling code from said engine start inhibiting unit to said central control unit only after issuance of said condition establishing signal.

27. A method of operating an anti-theft car protection system for a motor vehicle powered by an engine, comprising the steps of:

storing a first rolling code;

storing a second rolling code;

issuing an "ON" signal when an ignition switch of the vehicle is turned from an "OFF" position to an "ON" position and an "OFF" signal when the ignition switch is turned from the "ON" position to the "OFF" position;

comparing said first rolling code to said second rolling code responsive to the "ON" signal; and issuing an agreement signal if the first and the second rolling codes are in agreement and issuing a disagreement signal if the first and the second rolling codes are in disagreement;

setting a fail-safe flag responsive to issuance of said agreement signal;

clearing out said fail-safe flag responsive to said "OFF" signal; and issuing an engine start instruction signal responsive to said agreement signal and preventing the issuance of the engine start instruction signal responsive to said disagreement signal;

controlling the fuel injection to the engine such that fuel is injected to the engine responsive to the engine start instruction signal; and preventing suppression of fuel injection to the engine when said fail-safe flag is set.

28. A method according to claim 27, further comprising the step of changing said first and said second rolling codes responsive to said "OFF" signal.

29. A method according to claim 27, further comprising the steps of:

storing a key code;

issuing a key code signal when the ignition switch is turned from the "OFF" position to the "ON" position;

comparing said key code and said key code signal;

issuing a condition establishing signal if the key code and the key code signal are in agreement;

comparing said first rolling code to said second rolling code only after issuance of said condition establishing signal.

30. A method according to claim 29, further comprising the step of issuing a time over signal when a given time passes after issuance of said "ON" signal and prior to determining the first and the second rolling codes to be in agreement, wherein said given time begins at the time at which the condition establishing signal issues.

31. A method of operating an anti-theft car protection system for a motor vehicle powered by an engine, comprising the steps of:

issuing an "ON" signal when an ignition switch of the vehicle is turned from an "OFF" position to an "ON" position;

issuing a new code representing signal when one of a first rolling code and a second rolling code requires initializing;

initializing said first and said second rolling codes responsive to said new code representing signal;

storing said first rolling code;

storing said second rolling code;

issuing an engine start instruction signal if said stored first rolling code and said stored second rolling code are in agreement; and controlling the fuel injection to the engine to start the engine responsive to said engine start instruction signal.

32. A method of operating an anti-theft car protection system for a motor vehicle powered by an engine, comprising the steps of:

storing a first identification code;

storing a second identification code;

issuing an "ON" signal when an ignition switch of the vehicle is turned from an "OFF" position to an "ON" position for instructing starting of the engine and an "OFF" signal when the ignition switch is turned from the "ON" position to the "OFF" position;

comparing said first and said second identification codes responsive to said "ON" signal;

issuing a disagreement signal if said first and said second identification codes disagree and issuing an agreement signal if said first and said second identification codes agree;

setting a fail-safe flag responsive to issuance of said agreement signal;

clearing out said fail-safe flag responsive to said "OFF" signal;

suppressing starting of the engine responsive to issuance of said disagreement signal only if said fail-safe flag is cleared and starting the engine responsive to issuance of said agreement signal; and changing said first and said second identification codes after starting of said engine.

33. A method according to claim 32, further comprising the steps of:

issuing a time-over signal when a given time passes after issuance of said "ON" signal and prior to issuance of said agreement signal; and suppressing the starting of the engine responsive to said time-over signal.

34. A method according to claim 33, wherein said given time begins at the time at which said ignition switch is turned to the "ON" position from the "OFF" position.

35. A method according to claim 33, wherein said given time begins at the time at which the engine starts.

36. A method according to claim 32, further comprising the steps of:

issuing a non-neutral signal when a transmission of the vehicle is in a non-neutral operating condition and responsive to issuance of said "ON" signal; and suppressing the starting of the engine responsive to issuance of said non-neutral signal only if said non-neutral signal is issued prior to issuance of said agreement signal.

37. A method according to claim 32, further comprising the steps of:

storing a key code;

issuing a key code signal when said ignition switch is turned from the "OFF" position to the "ON" position;

comparing said key code and said key code signal;

issuing a key agreement signal if said key code and key code signal are in agreement; and issuing a condition establishing signal responsive to said key agreement signal;

wherein said comparing of the first and the second identification codes is performed responsive to said condition establishing signal.

38. A method according to claim 32, further comprising the steps of:

issuing a new unit representing signal responsive to said "ON" signal when one of said first identification code and said second identification code require initializing; and initializing the first and the second identification codes responsive to said new unit representing signal.

* * * * *